United States Patent [19]

Skogström et al.

[11] 4,416,259

[45] Nov. 22, 1983

[54] METHOD AND ARRANGEMENT FOR HEAT CONDITIONING OF BUILDINGS

[75] Inventors: Lars Skogström; Bengt Bergqvist, both of Stockholm, Sweden

[73] Assignee: Aeromator Trading Company AB, Stockholm, Sweden

[21] Appl. No.: 224,542

[22] PCT Filed: Apr. 10, 1980

[86] PCT No.: PCT/SE80/00102

§ 371 Date: Dec. 11, 1980

§ 102(e) Date: Dec. 5, 1980

[87] PCT Pub. No.: WO80/02190

PCT Pub. Date: Oct. 16, 1980

[30] Foreign Application Priority Data

Apr. 11, 1979 [SE] Sweden ............................... 7903251
Mar. 3, 1980 [SE] Sweden ............................... 8001647

[51] Int. Cl.³ ............................................. F24J 3/02
[52] U.S. Cl. ................................. 126/429; 126/428; 126/430; 126/452; 98/31; 165/48 S
[58] Field of Search ............... 126/428, 431, 429, 419, 126/430, 452; 98/31; 165/48 S, 48, 49

[56] References Cited

U.S. PATENT DOCUMENTS

| | | | |
|---|---|---|---|
| 3,832,992 | 9/1974 | Trombe et al. | 126/429 |
| 4,031,880 | 6/1977 | Devin | 126/419 |
| 4,054,246 | 10/1977 | Johnson | 126/429 |
| 4,069,973 | 1/1978 | Edwards | 126/430 X |
| 4,111,359 | 9/1978 | Trombe et al. | 126/429 |
| 4,141,337 | 2/1979 | Bergen | 126/429 |
| 4,262,655 | 4/1981 | Jackson | 126/429 |
| 4,295,415 | 10/1981 | Schneider | 126/428 X |

FOREIGN PATENT DOCUMENTS 2841939 4/1979 Fed. Rep. of Germany .... 165/48 R

Primary Examiner—Larry Jones
Attorney, Agent, or Firm—Holman & Stern

[57] ABSTRACT

A method and arrangement for air conditioning completely or partly a locality in a building, where the construction of the building comprises elements of e.g. concrete having parallel channels through which air is passed. The used air is ventilated from the locality after this air has been heated by machines, electric lights, e.g. and people within the locality and heat exchangers having greater masses and in which the accumulating effect can be used. Comprise parts of the building which operate as regenerative heat exchangers. Used air is passed from the locality with a given temperature through channels (2) in elements (3) of the construction, whereby heat is transmitted to the elements, whereafter the air is passed out to the ambient environment. Fresh air is passed in the opposite direction from the ambient environment into the locality through the channels and these two phases are repeated regularly and regulated during 24-hour periods. The amount of air (air pressure) is simultaneously balanced within the locality.

17 Claims, 2 Drawing Figures

METHOD AND ARRANGEMENT FOR HEAT CONDITIONING OF BUILDINGS

FIELD OF THE INVENTION

The invention relates to a method and arrangement for heat conditioning completely or partly of a locality, or region in a building where the construction of the building comprises elements of e.g. concrete having parallel channels through which heated of cooled air is passed between the ambient environment and the locality in either direction.

BRIEF SUMMARY OF THE INVENTION

The object of the invention is to make use of the air which in the locality or region has been heated by people and/or mchines and also electric lights being placed in the locality, but which air when used up must be ventilated away. By the invention it is also possible to make use of the heat rising upwards to the ceiling of a locality and which heat otherwise will escape in the form of heat losses through the roof or must be ventilated away. A further advantage of the invention is to take care of the heat produced by the sun against the outside of the roof. According to the invention not only heated air is inserted into the locality but also fresh air and a continuous exchange of air is attained in the locality without draft or other inconveniences. It is known to heat exchange the fresh air with the used air by ordinary heat exchanger. According to the invention exchangers are used which have a greater mass (body) from which the accumulating effect can be used. The invention is thereby characterized by the concrete elements being adapted to work as regenerative heat exchangers so that the air (used air), before being passed to the ambient environment, is passed from the locality at the temperature there through the channels of the elements for transferring heat in the air to said elements, and during a following period of time the air is passed in the opposite direction from the ambient environment into the locality through said channels: these operations are alternated and regulated regularly during a complete twenty-four hour time period, whereby simultaneously the amount of air (air pressure) in the locality is balanced.

BRIEF DESCRIPTION OF THE DRAWINGS

An embodiment of the invention will now be described in detail with reference to the accompanying drawings wherein.

DETAILED DESCRIPTION

Figure 1:
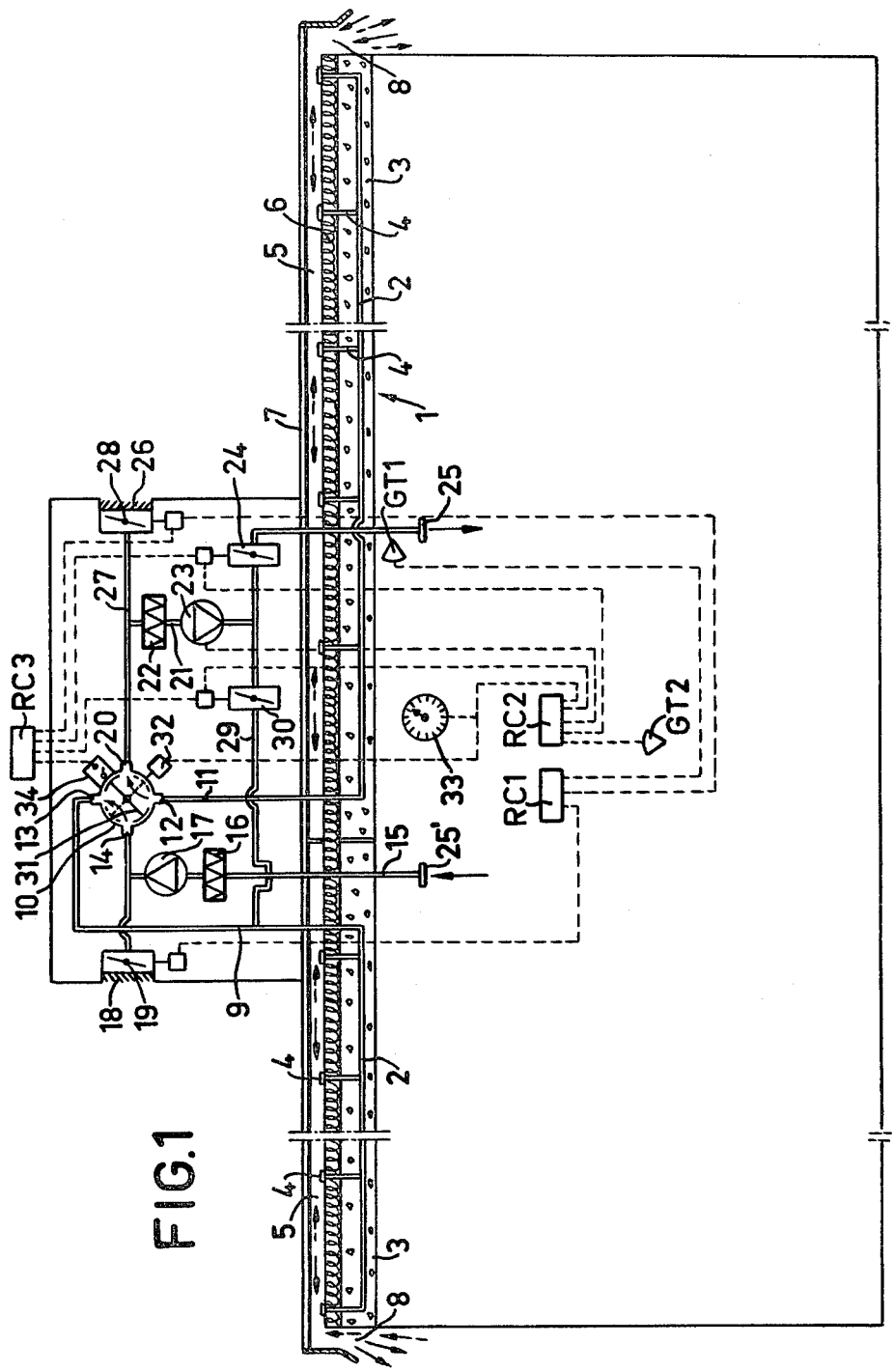
FIG. 1 is a schematic sectional view through a framework of a building showing the regulating means of the invention according to one embodiment.

FIG. 1 illustrates a principal drawing and a section through the roof construction of a building including the regulating means. It should be understood that a locality is placed under the roof construction.

The roof construction over the locality includes a floor framework 3 of concrete having channels 2 known per se. The channels 2 are distributed along the section with suitable distance between each other. At suitable intervals branch channels 4 are provided leading upwards from the channels 2 to a narrow space 5 between an insulation 6 on the framework 3 and a covering layer 7. The roof construction thus includes the covering layer 7, the narrow space 5, the insulation 6 and the framework 3. The framework 3 is self-supporting and consists preferably of slabs having supporting beams or flanges (not shown).

Air exchanging to and from the narrow space 5 is performed via openings 8 at the eaves. Air can thus pass from the ambient environment through the openings 8, through the narrow space 5, down through the branch channels 4, through the channels 2 and further on to a piping as described hereinafter.

As can be seen from FIG. 1 the left part of the roof is identical with the right part. Channels 2 of the left part of the roof lead via a common collecting main 9 to a four-way valve 10. The channels 2 of the right part of the roof also lead via a second common collecting main 11 to said four-way valve 10. The second collecting main 11 is connected to the four-way valve 10 at a port 12, which is placed opposite to a port 13, to which the first collecting main 9 is connected. The four-way valve 10 has a third port 14 which is connected with the locality via an air conditioning means, fan 12, exhausting pipe 15 and an exhausting means 25. An intake 18 from the ambient environment having a flow control damper 19 therein is also connected to the port 14. A fourth port 20 is connected to an inlet pipe 21, which is connected to the locality via an air conditioning means 22, a fan 23, flow control damper 24 and inlet means at 25. An intake 26 from ambient the environment is also connected with the port 20 via a pipe 27 and a flow control damper 28. The pipe 21 is connected to the collecting main 9 via a branch pipe 29 and a flow control damper 30.

The four-way valve 10 includes a valve housing which has a circular section and which contains a rotatable flap 31 driven by a motor, see block symbol 32, a timing relay 33 regulating the motor 32 and thus the rotating of the flap 31 so that it can occupy different positions during certain periods of time in order to make a connection between adjacent ports 12 and 20 or 13 and 14 or closing any connection between opposite ports 14 and 20 and 12 and 13. The flap 31 can be driven intermittently or slowly when carrying out these connections. The procedure will now be described more in detail.

The timer 33 is connected to regulating box RC2 and moreover there are two regulating panels RC1 and RC3. The regulating panel RC1 regulates the dampers 19 and 28 and senses the temperature in the opening 25 of the inlet pipe 21. The regulating box RC2 regulates, besides the timer 33, also the damper 30, the fan 23 and the damper 24. The regulating panel RC3 regulates the dampers 30 and 24 and also the damper 28. Moreover the regulating panel RC3 senses the difference between the pressures at both sides of the flap 31 at its different positions.

The main object of the invention is to regulate the current of air through the right part and the left part of the roof by means of the four-way valve 10, that is to say, the air shall pass through the channels so that the roof construction acts as a regenerative heat exchanger. During a first period of time fresh air is drawn through the openings 8 at the right side of the roof and into the channels 2 at the right via the branch channels 4 at the right after the air has passed through the narrow space 5 between the covering layers 7 and the insulation 6, as shown in the embodiment illustrated in FIG. 1. After the air has passed through the right channels 2, the air is collected in the collecting main 11 and will reach the four-way valve 10 via the port 12. The flap 31 is in such a position, as shown that the air is directed to the right in the figure by means of the sucking effect of the fan 23. The damper 28 is closed, and so is the valve 30 while the valve 24 is open, whereby air will pass into the locality via the opening 25. During the same period of time heated air is sucked from the locality via the exhausting port 25 and pipe 15 by means of the fan 17 and this heated air is passed on to the port 14 of the four-way valve 10, damper 19 being closed. Because of the position of the flap 31 the air is passed to the port 13 and out through the collecting main 9 and further on to the openings 8 at the left side of the roof via channels 2, the branching channels 4 and the narrow space 5 of the left part of the roof. Because of the heat content of this air, heat will be accumulated in the framework 3, at the left that is to say in the concrete slabs 3. The first period of time is now closed and the second period of time, which may last e.g. 30 minutes will now start. The flap 31 is now changing position and will be rotated 90° clockwise to the position which is shown in FIG. 1 with dashed lines. It is hereby understood, that the warm air which is passed through the exhaust pipe 15 will escape through port 12 and out through the collecting main 11 and further-on to channels 2 of the right part of the roof construction. In the corresponding manner the fan 23, instead of sucking air from the pipe 11, will suck air from the collecting main 9 via the ports 13 and 20. The heat contents which earlier has been accumulated in the left part of the roof construction will thereby be absorbed by the fresh air, which is sucked into the roof construction from the left side thereof and will be passed on into the locality via the opening 25. At the same time the used air in the locality will be passed out from the locality through the right part of the roof construction via the exhaust port 25, pipe 15, pipe 11 and, right side channels 2 and 4, and will heat this part of the roof construction. As mentioned above, this period of time may be 30 minutes, whereafter the flap 31 once again will change position and thereby the direction of the air current. It is hereby understood that the two parts of the roof construction will be alternately heated and cooled. In order to balance the amount of air in the locality the amount of air, which is sucked out is the same as the amount of air which is sucked into the roof construction and this is because the roof construction is divided into two similar parts. The roof construction in this way is heated and this heat will be transmitted to the fresh air, which after being passed into the locality can be used to transmit heat from the locality to the roof construction. In addition, the heat of the sun can be absorbed by the roof construction.

The air, which is sucked from the locality may be dirty and thereby contaminate the channels 2. Therefore a system for blowing of the channels and also the narrow space 5 is provided to clean out these areas. This blowing is performed by rotating slowly so that it passes the ports during a certain delay period. Thus, all ports 12, 13, 14 and 20 are, during this period of time, closed off from each other. A pressure sensing means 34 will sense the pressure rise over the flap and will open the damper 28 and valve 30 by the regulating panel RC3 and simultaneously the valve 24 will be closed. The fan 23 will now blow fresh air sucked through the inlet 26 and passed through the opened damper 30 and the collecting main 9 through the channels 2, 4 and the narrow space 5. This blowing may be carried on for say 2 minutes, but it should be understood that this time can be shortened or prolonged by regulating the rotating speed of the flap. However, the pressure will decrease when the flap is passing the ports 12 or 20 and the pressure sensing means will give a signal to the regulating panel RC3, whereby the damper 28 and valve 30 are closed and the valve 24 is opened. After the blowing out process the procedure described above for circulating the air to the locality can be started again.

If the temperature of the fresh air to the locality will be too high, e.g. during autumn and spring, the thermostat GT1 will react and deliver a signal to the regulating panel RC1 regulating one of the dampers 19 and 28 so that fresh air is supplied and mixed with the air passing through the channels.

The dampers 19 and 28 are open during summer time. If the temperature in the locality is too high, the temperature sensor GT2 will react and deilver a signal to the regulating box RC2 so that, the flap 31 will occupy a position, in which the ports 14 and 20 are closed. At the same time the valve 30 is opened and the fan 23 is running. Fresh air will now be sucked through the damper 28 and will be passed to the locality through the opening 25 via the valve 24 and to the channels 2 via the damper 30. The channels 2 will thereby be cooled and will lead away the transmission heat from the roof construction so that the roof will act as a cooler of radiated heat.

It shall be observed, that the embodiment now described includes the narrow space 5 between the cover layer 7 and the insulation 6. The operation of the invention and the advantage of the invention is however not limited to the existence of this narrow space.

Figure 2:
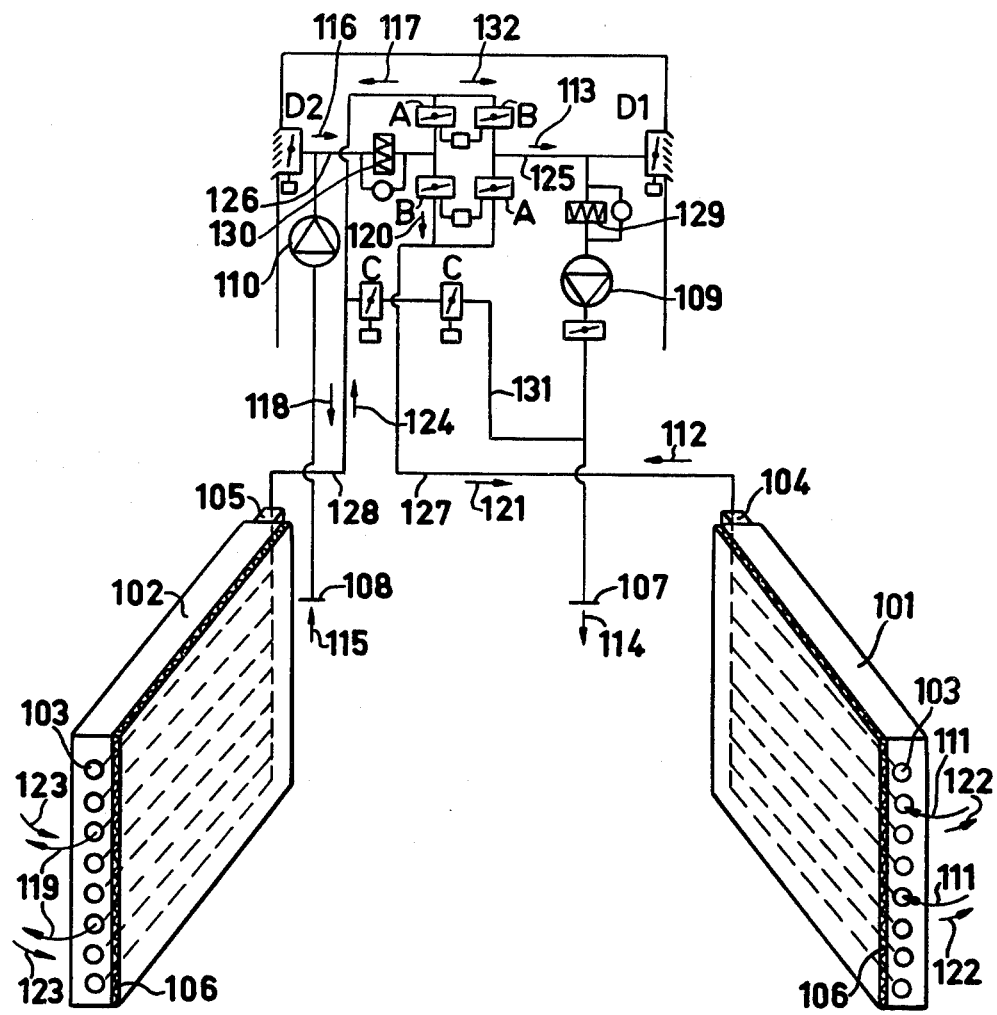
FIG. 2 is a schematic sectional perspective view through two opposite walls of a building showing the piping and the regulating means according to a second embodiment of the invention.

The second embodiment is shown in FIG. 2 and the locality, which shall be controlled by the invention, is defined by a ceiling, walls and a floor not shown. Two walls are diagramatically shown in the form of two wall elements 101 and 102 and the wall element 101 can e.g. be a part of a wall facing to the north and the wall element 102 can be a part of a wall facing to the south. The two walls thus consist of several wall elements, which have parallel channels 103 placed horizontally. The channels 103 can be connected in series or in parallel according to specific wishes, but according to the shown embodiment the channels are in parallel from one end of the wall element to the other end and are connected in one end by a distributing main 104 in the wall element 101 and a distributing main 105 in the wall element 102. In the second end of the wall element there is a collecting main not shown by means of which the channels 103 open directly out to the ambient environment or can be connected to one more elements according to the size of the elements forming the wall of the building. The wall elements 101 and 102 have a heat insulation 106 on their inner faces.

The channels 103 are holes in the concrete elements 101 and 102 so that the heat in the air passing through the channels can be transmitted to the concrete and the number of channels and their cross section are adapted so that preferably the complete mass of concrete is affected by heat transmission from the air through the sides of the channels to the mass of concrete. It shall be noted, that FIG. 2 shows all channels 103 in one element being connected in parallel from the distributing main 104, but several of the channels in one element may be connected in series so that the air is passed to and through one and the same element before passing out from the element in the second end of the element.

In FIG. 2 the piping for passing the air to and through the locality is shown. This piping includes an inlet opening 107. Moreover, there is an exhaust opening 108. These openings are preferably placed high in the locality and a certain distance from each other. The openings are preferably placed so that the minimum possible draft exists in the locality. The two openings are operated so, that fresh heated air is supplied to the locality through the inlet opening 107 and used air is passed away by means of the exhaust opening 108. The supply of fresh air is carried out by a fan 109, which is connected to the inlet opening 107 and the exhaust air is passed away by means of a fan 110, which is connected to the exhaust opening 108. The inlet to fan 109 is connected by a pipe 125 to one side of a system including four valves, or dampers A and B, which are connected in parallel two by two. The outlet of fan 110 is by the pipe 126 connected to the second side of said system of dampers. The distributing main 104 of the wall element 101 is connected via a pipe 127 to one end of said system of valves. The distributing main 105 of the second wall element 102 is connected via a pipe 128 to said second end of the system of valves.

A damper D1 is directly connected to the pipe 125 and directly opens into the ambient environment. In the same way the damper D2 is directly connected to the pipe 126 and opens directly to the environment. As can be seen the pipe 125 also includes a heating means 129, which may be used during certain circumstances and a similar heating means 130 is arranged in connection with the pipe 126. Moreover, there is a branch connection between the pipes 127 and 128 by through a valve C and this branch connection is also connected to an inlet pipe, connected to the inlet 107, via the pipe 131 and a second valve C.

An operation where the wall elements 101 and 102 act as regenerative heat exchangers during winter conditions will now be described. During a first period of time the valves A are open and the valves B are closed. The air will now be drawn by the fan 110 through exhaust opening 108 at the arrow 115, will follow the pipe 126 according to the arrow 116, will pass through the left one of the valves A and will follow the arrow 117 and pass down through the pipe 128 according to the arrow 118 and will be passed into the distributing main 105. Hereafter the air, which is used air, will be distributed in the channels 103 and thus pass through the wall element 102 or a certain number of elements 102, whereby the wall, e.g. a wall facing to the south will be heated by the heat contents of the used air. The used air will leave this wall according to the arrows 119, that is to say from the ends of all channels 103.

Fresh air to the locality, which will pass out through the inlet opening 107 is drawn by the fan 109 from another wall, that is to say the wall element 101, whereby the arrows 111 show that fresh air, which has the temperature of the ambient environment is passed into all channels 103 in the concrete element 101. The air is collected in the collecting main 104 and is passed through channel 127 according to the arrow 112 and will pass through the open valve A on the right and further on through the pipe 125 according to the arrow 113 and through the fan 109 and out through the inlet opening 107 according to the arrow 114. This operation of the air will continue during a certain period of time and the time is calculated to be so long that the concrete wall element 102 has been given a higher temperature from the used air. After this period of time has been concluded, the direction of the air current is reversed through the elements 101 and 102. This is accomplished by closing valves A and opening valves B. Hereby the air will follow the arrows 115, 116, 120, 121 and will be passed into the distributing main 104, through the wall element 101 and out from the ends of the channels 103 according to the arrows 122. The fresh air will be entered in the other wall and into the concrete element 102 according to the arrows 123, will pass through the element 102 and will be collected in the collecting main 105. The air will then follow the piping according to the arrows 124, 132,113 and via the fan 109 out through the inlet opening 107 according to the arrow 114. The temperature of the fresh air will thereby be raised by the concrete element 102 because of the accumulated heat in this element during the preceding period of time. On the other hand, the used air will now be passed out through the other wall element 101 and will raise the temperature of this element so that the accumulated heat can be used during the following period of time when the direction of the air current is reversed and fresh air will be passed into the element 101. In this way heat will be recovered from the used air by the fresh air because the two wall elements 101 and 102 will alternately be heated and give up heat.

If the heat to the locality is not sufficient in this way, the elements 129 and 130 will be activated in order to further heat the fresh air. This can be regulated automatically by means of a sensor, which senses the temperature of the fresh air being inserted into the piping and then compares it with the necessary temperature according to existing circumstances.

The operation described above consisting in the alternated directions of the air current through the wall elements 101 and 102 is regulated by means of a timer, so that a certain frequency is established. This frequency may be adjusted, say between 10 and 60 minutes and the regulation may also be so accomplished that the temperature in the locality or the used air is set to be 20° C., while the fresh air must not be lower than +15° C. The regulation thus is accomplished by the valves A and B which open and close respectively automatically in accordance with the set frequency. When there is a maximum need of heat, the air heating means 129 and 130 are activated and the valves A and B are alternately completely open or completely closed according to the set frequency, that is to say the valves are either completely open or completely closed during a certain period of time. The dampers D1 and D2 are closed. When the need of heat is decreasing, the heating means are stopped and all the required heat to the locality is accomplished by recovering heat from the used air. If the need of heat should further decrease, the inlet damper D1 and outlet damper D2 are opened to some extent so that a certain amount of fresh air is inserted to the inlet opening 107 without being heated and a certain amount of used air from the exhaust opening 108 is passed away through the damper D2 without its heat being recovered in either of the two wall elements 101 and 102. If the need of heat should be so small, that no heat at all needs to be supplied to the locality, then the two dampers D1 and D2 open completely while all the valves A and B close.

When the temperature of the locality is too high, the speed of the fan 109 will be regulated to maximum and simultaneously the two valves C are opened. Half of the fresh air current will thereby be drawn via the fan 109, and the valve C through either of the two wall elements and will thereafter be evacuated to the environment.

The operation according to the invention also means, that at least some times the channels during a short period of time are passed through by fresh air, which is drawn from the ambient environment and delivered to the ambient environment in order to clean the inner sides of the channels from dirt, which can come from the locality.

It is possible to vary the operation of the invention. It has been mentioned above that channels 2 and 103 may be connected in parallel or combination of parallel and in series or only in series. The invention is not limited to the two embodiments of the piping and the valves being shown and described above and within the spirit of the invention these means may be varied within the scope of the following claims. It should also be observed, that the invention has been described in connection with two separate roof parts and wall parts, respectively. However, it is possible to work the invention using only one and the same part in order to alternately insert fresh air and remove the used air. It shall also be noted, that according to the two described embodiments the air pressure in the locality has been kept equal by the fact that the elements have been divided into two similar parts, so that the same amount of air is inserted into the locality as being removed. Within the scope of the invention there are other ways of balancing the amount of air in the locality, for instance by inserting air directly or remove air directly, whereby the inserting of fresh air for instance may be performed by a conventional heating means.

We claim:

1. Method for air conditioning a region in a building where the building utilizes construction elements of concrete or the like having channels therein through which air is passed between the outside environment and said region, comprising passing air from said region through the channels of said elements from said region to the outside environment for a first predetermined period of time to thereby transfer the temperature condition of the air leaving the region to said construction elements, reversing the flow by passing said air from the outside environment through said channels to said region for a second predetermined period of time to thereby transfer the temperature condition of the construction elements to said air entering said region, alternating said flows for said first and second periods of time regularly substantially continuously, and regulating said flows and said first and second periods of time to control the temperature in said region and to simultaneously balance the air pressure in said region, so that said construction elements function as regenerative heat exchangers.

2. Method according to claim 1 wherein said construction elements form at least two of the walls of the building, and further comprising dividing said flow of air so that when air is passed from the outside into said region through the channels of one wall, air is simultaneously passed from said region through and out of the channels of a second wall to the outside.

3. Method according to claim 1, wherein said construction elements form a floor type frame-work, and further comprising, dividing said flow of air so that when air is passed from the interior of said region through the channels of a certain part of the framework, to the outside environment air is simultaneously passed from the outside environment through the channels of a second part of said framework, to said region, and controlling the division of the flow so that said second part of the framework traversed by the flow is substantially equal to said first part of the framework.

4. Method according to any one of claims 1, 2 or 3, and further comprising interrupting said substantially continuous alternating flows for a relatively sort period of time and passing air from the outside environment through said channels only and return to the outside enironment in order to clean the channels from dirt during said period of interruption.

5. Method according to any one of the claims, 1, 2 or 3, and further comprising passing air through the channels from the outside environment directly to be mixed with the air passing through the channels, and mixing this outside air with the air passing through the channels before this air is passed into the region.

6. Method according to claim 3, and further comprising providing a covering layer spaced from said framework to form a narrow space therebetween, and passing said air through said narrow space in series with said flow through said channels.

7. An arrangement for air conditioning a region within a building where the building utilizes construction elements of concrete or the like having channels wherein through which air is passed comprising, a first group of channels in said construction elements, means to connect said first group of channels to the outside environment, a second group of channels at a different location in said construction elements, second means to connect said second group of channels to the outside environment, at least one exhaust duct for said region adapted to be alternately communicated with said first group of channels and said second group of channels, at least one inlet duct for said region adapted to be alternately communicated with said first group of channels and said second group of channels, pump means to force said air through said ducts and channels, and valve means operably connected to said exhaust and inlet ducts and to said first and second groups of channels to connect said exhaust duct alternately with said first and second groups of channels while simultaneously connecting said inlet duct alternately with said second and first group of channels to control the flow of air reversibly through said first and second groups of channels between said ducts and the outside environment.

8. An arrangement as claimed in claim 7 wherein said pump means comprises a first fan in said exhaust duct between said region and said valve means and a second fan in said inlet duct between said region and said valve means, and regulation means operably connected with said valve means and said region to balance the air pressure within said region.

9. Arrangement according to claim 8 wherein said regulation means includes a timer for controlling the valve means to reverse flow through said channels at predetermined intervals.

10. Arrangement according to claim 8 wherein said valve means comprises a four-way valve having a valve housing, four ports, and a driven valve body, each one of said exhaust and inlet ducts being connected to a respective one of said ports and each of said two groups of channels being connected to a respective one of the remaining ports, and means to drive said valve body intermittently to alternately connect the port of said exhaust duct with the port of said first group of channels and the port of said inlet duct with the port of said second group of channels and vice versa.

11. Arrangement according to claim 10 wherein said valve body in an intermediate position between said alternate connecting positions closes said ports to said channels, and further comprising a fist outside inlet connected to the inlet of said second fan, and a damper valve in said first outside inlet to control the flow of outside air therethrough.

12. Arrangement according to claim 10 wherein said above valve housing has a circular cross-sectional shape, said valve body comprises a baffle rotatably mounted within said housing, said ports of said exhaust and inlet ducts are oppositely disposed with respect to each other, and said ports of said first and second groups of channels are oppositely disposed with respect to each other, so that when said baffle is between the oppositely disposed ports it closes said oppositely disposed ports with respect to each other and connects the adjacent ports on each side of said baffle.

13. Arrangement according to claim 7 wherein said pump means comprises a fan in said inlet duct between said valve means and said region, and further comprising a first outside inlet connected to the inlet of said fan, and a damper valve in said first outside inlet to control the flow of outside air therethrough.

14. Arrangement according to claim 7 wherein said construction elements comprise separate walls of said region, said first group of channels is disposed in one of said walls, and said second group of channels is disposed in another one of said walls.

15. Arrangement according to claim 7 wherein said valve means comprises four valves connected in parallel pairs, the valves in each pair being connected in series, said first and second groups of channels being connected to opposite sides of the parallel pairs of valves, said inlet duct being connected between the valves of one pair in series, and said exhaust duct being connected between the valves of the other pair in series.

16. Arrangement according to claim 15 and further comprising regulating means including a timer operably connected to said valves to reverse the flow through said channels at predetermined intervals.

17. Arrangement according to claim 7 wherein said construction elements comprise a floor framework of said building.

* * * * *